US008605423B2

(12) United States Patent
Chen et al.

(10) Patent No.: US 8,605,423 B2
(45) Date of Patent: Dec. 10, 2013

(54) COMPUTING DEVICE WITH DISK DRIVE MODULE

(75) Inventors: Yun-Lung Chen, New Taipei (TW); Zhi-Qiang Li, Wuhan (CN)

(73) Assignees: Hong Fu Jin Precision Industry (WuHan) Co., Ltd., Wuhan (CN); Hon Hai Precision Industry Co., Ltd., New Taipei (TW)

(*) Notice: Subject to any disclaimer, the term of this patent is extended or adjusted under 35 U.S.C. 154(b) by 213 days.

(21) Appl. No.: 13/325,238

(22) Filed: Dec. 14, 2011

(65) Prior Publication Data

US 2012/0314361 A1 Dec. 13, 2012

(30) Foreign Application Priority Data

Jun. 8, 2011 (CN) .......................... 2011 1 0151959

(51) Int. Cl.
*G06F 1/16* (2006.01)
*H05K 5/00* (2006.01)
*H05K 7/16* (2006.01)
*A47B 81/00* (2006.01)

(52) U.S. Cl.
USPC ................ 361/679.33; 361/679.37; 361/724; 361/725; 312/223.1; 312/223.2

(58) Field of Classification Search
USPC .......................... 361/679.31–679.4, 724–727; 312/223.1, 223.2
See application file for complete search history.

(56) References Cited

U.S. PATENT DOCUMENTS

| 6,318,823 | B1* | 11/2001 | Liao ............................ 312/223.2 |
| 6,404,625 | B1* | 6/2002 | Chen et al. ............... 361/679.33 |
| 6,700,776 | B2* | 3/2004 | Bang et al. ............... 361/679.58 |
| 7,433,183 | B2* | 10/2008 | Huang ..................... 361/679.33 |
| 8,000,089 | B2* | 8/2011 | Chang ..................... 361/679.02 |
| 2001/0046117 | A1* | 11/2001 | Felcman et al. .............. 361/683 |
| 2005/0105266 | A1* | 5/2005 | Wang ........................... 361/685 |
| 2007/0058333 | A1* | 3/2007 | Kim ............................. 361/683 |
| 2008/0144275 | A1* | 6/2008 | Chen et al. .................... 361/685 |

* cited by examiner

*Primary Examiner* — Jayprakash N Gandhi
*Assistant Examiner* — Nidhi Desai
(74) *Attorney, Agent, or Firm* — Altis Law Group, Inc.

(57) ABSTRACT

A computing device includes a chassis, a motherboard, a mounting plate, and a disk drive module attached to the mounting plate. The chassis includes a base panel and a pair of side panels connected to opposite sides of the base panel. The motherboard is mounted on the base panel. The mounting plate is secured to the pair of side panels and is inclined at an angle relative to the base panel. The disk drive module is inclined at the same angle as the mounting plate. At least one expansion card is attached substantially perpendicular to the motherboard. The disk drive module includes a first end and a second end opposite to the first end. The first end is located higher than a top edge of the at least one expansion card. The second end is located lower than the at least one the expansion card.

17 Claims, 6 Drawing Sheets

COMPUTING DEVICE WITH DISK DRIVE MODULE

BACKGROUND

1. Technical Field

The present disclosure relates to a computing device with at least one disk drive module.

2. Description of Related Art

Computing devices include a chassis, a motherboard mounted in the chassis, and at least one disk drive installed in the chassis. The chassis includes a base panel and a pair of side panels perpendicularly connected to opposite sides of the base panel. The motherboard is attached to the base panel. A plurality of expansion cards is perpendicularly attached to the motherboard. The at least one disk drive is movable along a horizontal direction that is parallel to the base panel and the pair of side panels to be mounted in the chassis or detached from the chassis. However, the plurality of expansion cards sometimes blocks the horizontal movement of the at least one disk drive.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
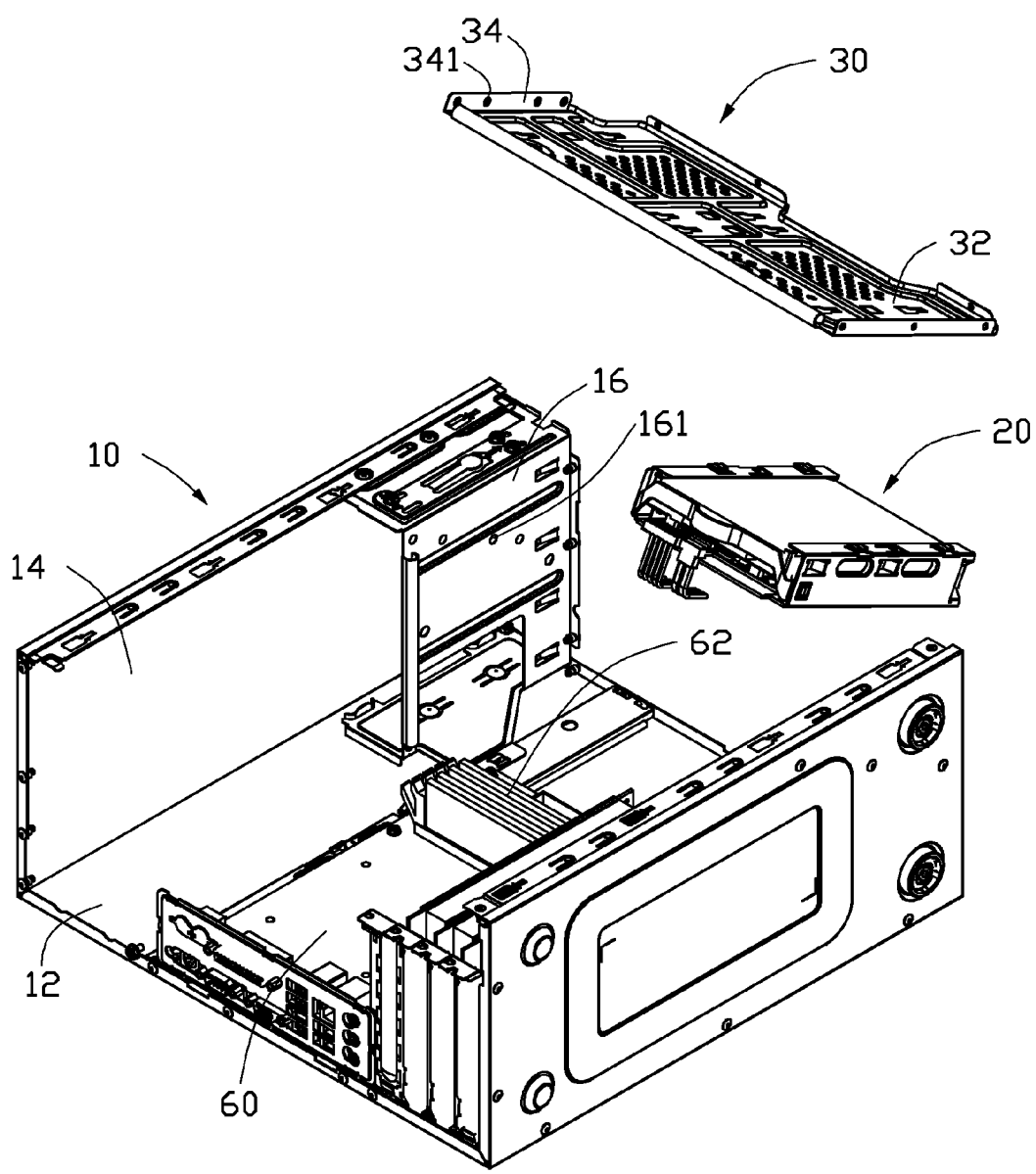
FIG. 1 is an exploded, isometric view of an embodiment of a computing device.

Referring to FIG. 1, an embodiment of a computing device includes a chassis 10, a disk drive module 20, and a mounting plate 30. The chassis 10 includes a base panel 12 and a pair of side panels 14 connected substantially perpendicular to opposite sides of the base panel 12. A motherboard 60 is attached on the base panel 12. A plurality of expansion cards 62 is attached to the motherboard 60 and is substantially perpendicular to both the base panel 12 and the pair of side panels 14. A bracket 16 is securely attached to an interior side of a first side panel of the pair of side panels 14. A plurality of first securing holes 161 is defined in the bracket 16. A plurality of second securing holes 141 is defined in a second side panel of the pair of side panels 14. The plurality of first securing holes 161 and the plurality of second securing holes 141 secure the mounting plate 30 in the chassis 10. The plurality of first securing holes 161 is arranged along a first oblique line. The plurality of second securing holes 141 is arranged along a second oblique line. The first oblique line and the second oblique line are substantially parallel to the base panel 12.

Figure 2:
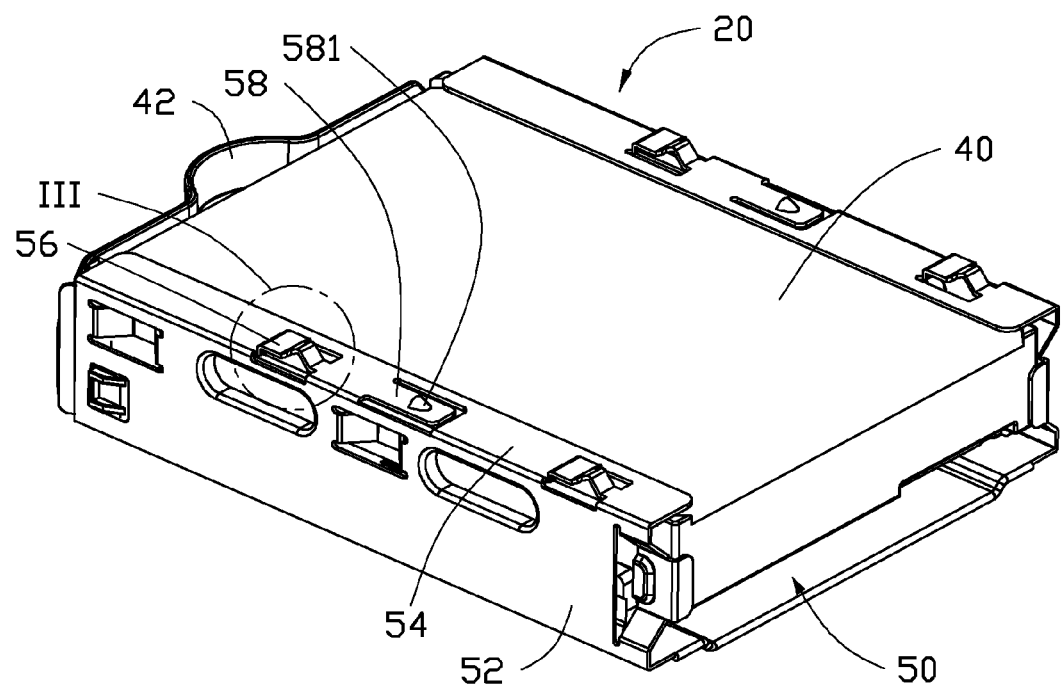
FIG. 2 is an isometric view of a disk drive of the computing device of FIG. 1.

Referring to FIG. 2, the disk drive module 20 includes a disk tray 50 and a disk drive 40 mounted in the disk tray 50. In one embodiment, the disk drive 40 is a hard disk. A handle 42 is attached to one end of the disk drive 40 for pushing or pulling the disk drive 40 into or out from the disk tray 50. The disk tray 50 includes a pair of side plates 52 abutting opposite side walls of the disk drive 40. A top flange 54 extends substantially perpendicularly from a top edge of each of the pair of side plates 52. A pair of securing protrusions 56 protrudes upward from the top flange 54. The top flange 54 includes a resilient piece 58 located between the pair of securing protrusions 56. A bump 581 protrudes from the resilient piece 58.

Figure 3:
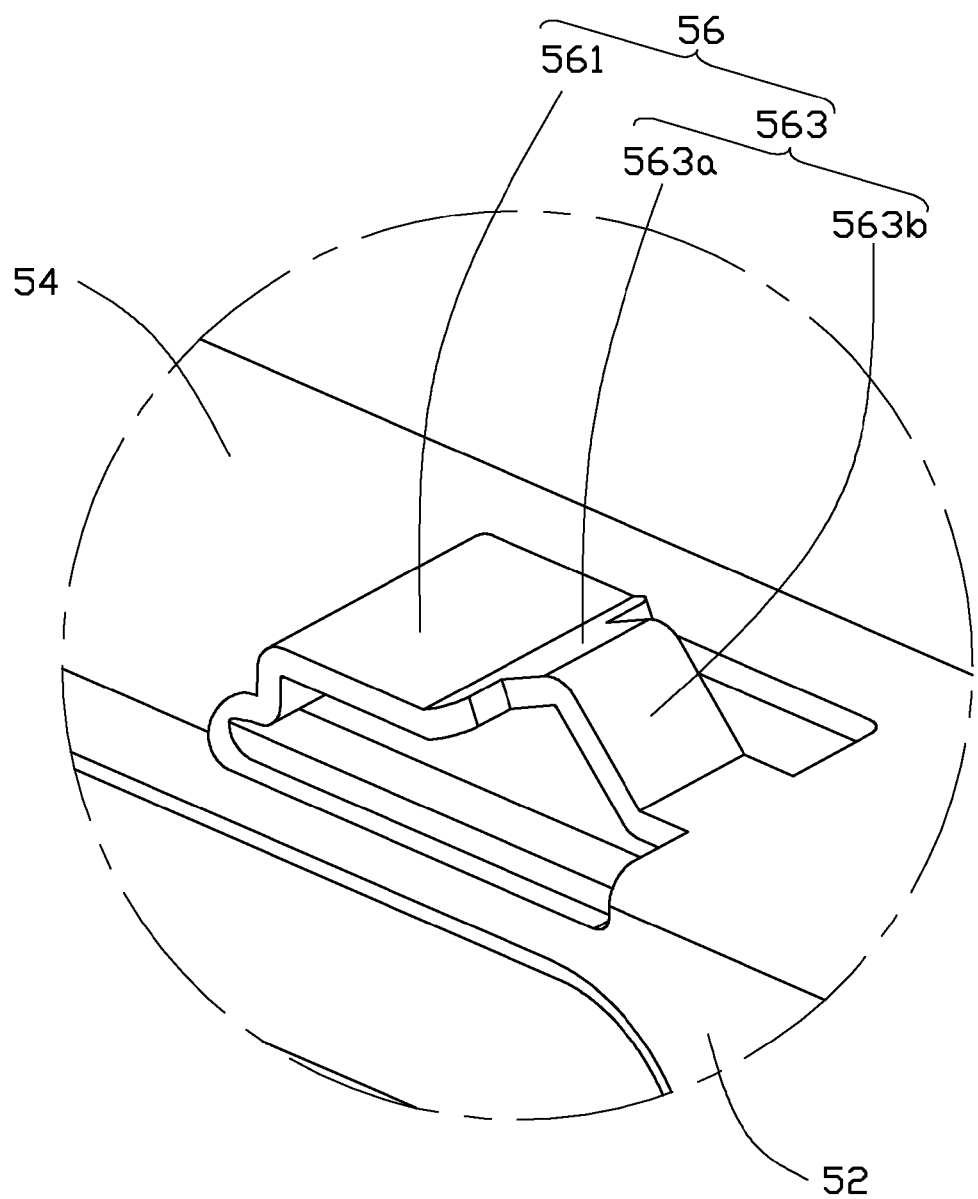
FIG. 3 is an enlarged view of the circled portion III of FIG. 2.

Referring to FIG. 3, each of the pair of securing protrusions 56 includes an engaging portion 561 and a blocking portion 563 extending from the engaging portion 561. The engaging portion 561 is substantially L-shaped. The blocking portion 563 includes a connecting piece 563a extending from the engaging portion 561 along an upwardly oblique direction and a blocking piece 563b extending from the connecting piece 563a along a downwardly oblique direction. The connecting piece 563a and the blocking piece 563b have substantially the same width, which is less than the width of the engaging portion 561.

Figure 4:
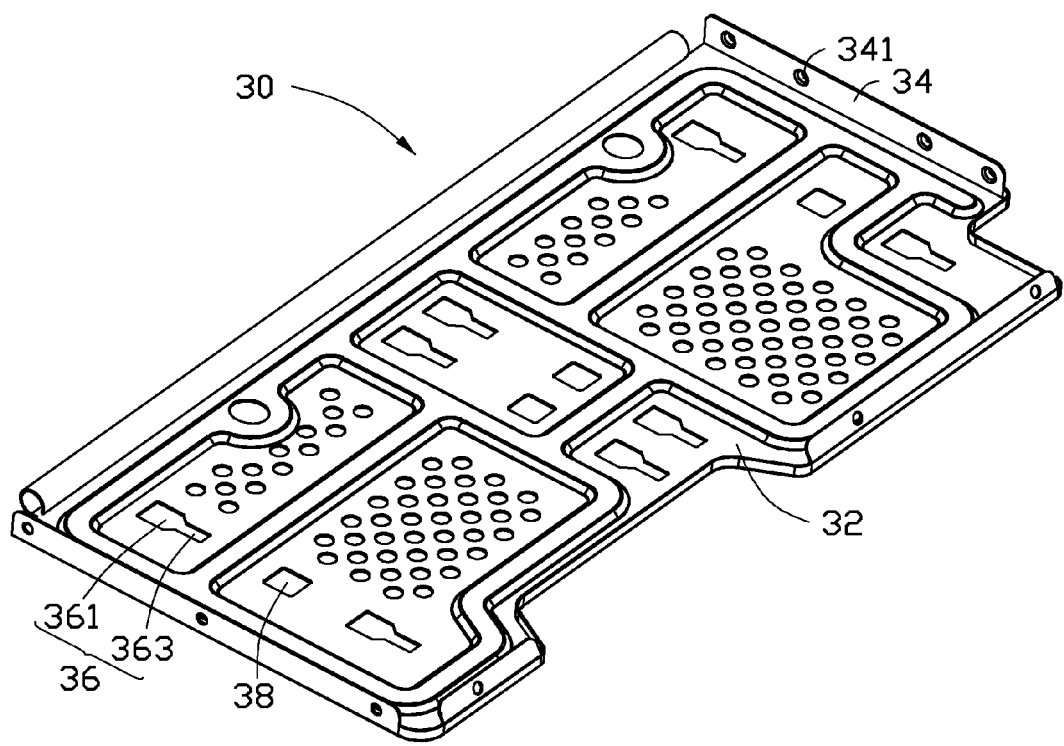
FIG. 4 is an enlarged view of a securing board of the computing device of FIG. 1.

Referring to FIGS. 1 and 4, the mounting plate 30 includes a main plate 32 and a pair of flanges 34 extending substantially perpendicularly from opposite sides of the main plate 32. A plurality of mounting holes 341 is defined in each of the pair of flanges 34 corresponding to the plurality of first securing holes 161 and the plurality of second securing holes 141. At least one pair of securing openings 36 is defined in the main plate 32 and engageable with the pair of securing protrusions 56. At least one limiting opening 38 is defined in the main plate 32 and engageable with the bump 581. Each of the at least one pair of securing openings 36 includes a wide portion 361 corresponding to the engaging portion 561 and a narrow portion 363 corresponding to the blocking portion 563.

Figure 5:
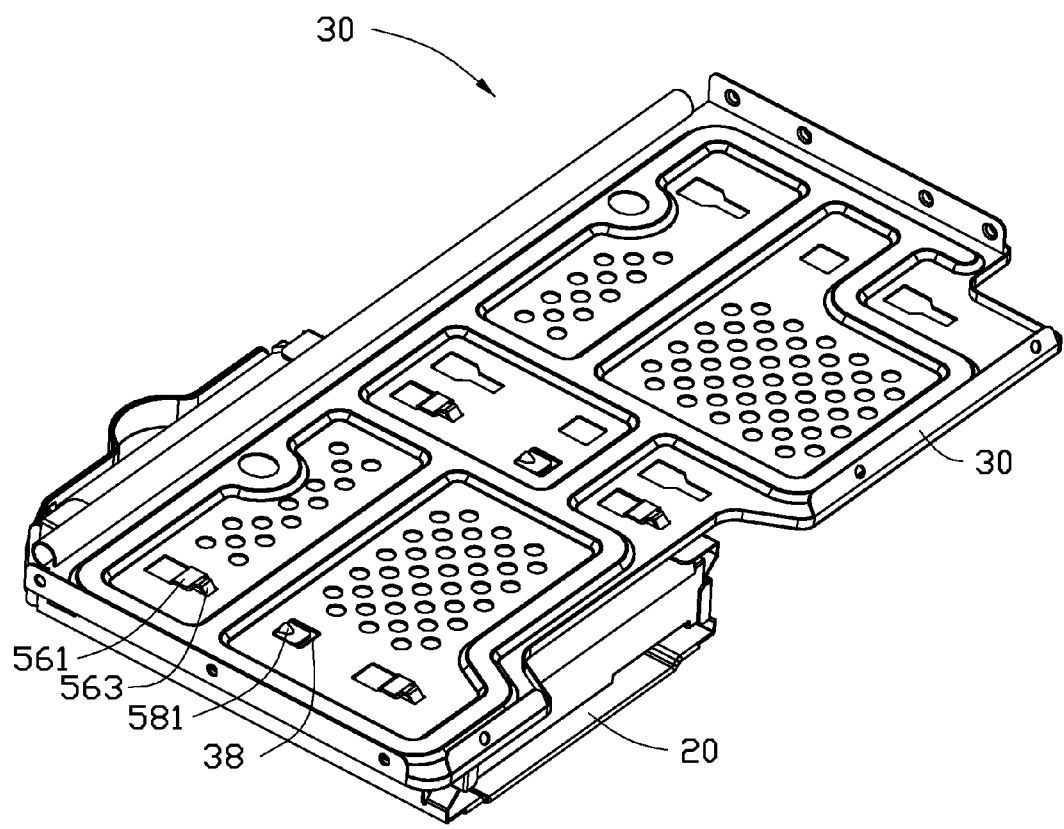
FIG. 5 is an assembled view of the disk drive of FIG. 2 and the securing board of FIG. 4.
Figure 6:
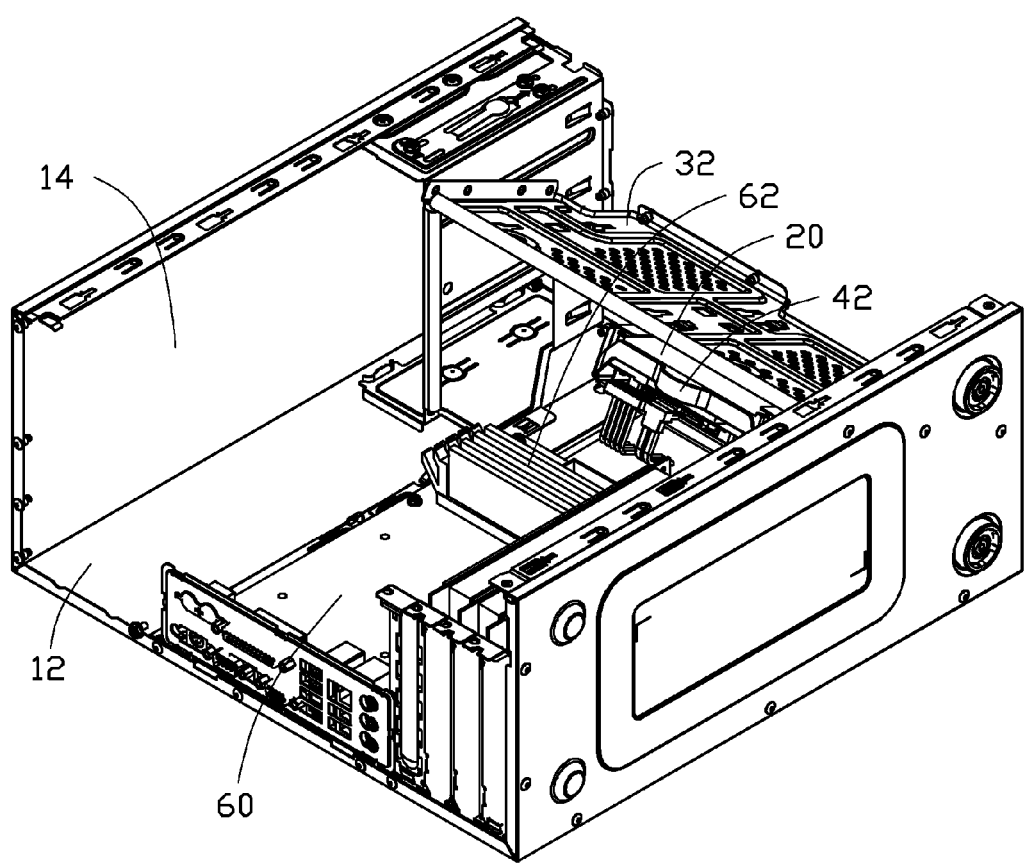
FIG. 6 is an assembled view of the computing device of FIG. 1.

Referring to FIGS. 5 and 6, in assembly, the plurality of mounting holes 341 is aligned with the plurality of first securing holes 161 and the plurality of second securing holes 141 for receiving fasteners (not shown). The mounting plate 30 is secured in the chassis 10 by fasteners and is oriented obliquely relative to the base panel 12. The disk drive module 20 moves along a lower surface of the mounting plate 30 in a first inclined direction. The pair of securing protrusions 56 moves in the at least one pair of securing openings 36. The engaging portion 561 moves from the wide portion 361 to the narrow portion 363 and abuts a top surface of the mounting plate 30. The blocking portion 563 engages within the narrow portion 363. The blocking piece 563b abuts an edge of the narrow portion 363 to prevent the disk drive module 20 from moving in the first inclined direction. The engaging portion 561 prevents the disk drive module 20 from moving down from the mounting plate 30. The bump 581 is engaged within one of the at least one limiting opening 38 to prevent the disk drive module 20 from moving in a second inclined direction that is reverse to the first inclined direction. Thus, the disk drive module 20 is secured to the lower side of the mounting plate 30 and is oriented obliquely relative to the base panel 12. The disk drive module 20 and the mounting plate 30 are equally inclined relative to the base panel 12.

To detach the disk drive module 20 from the mounting plate 30, the resilient piece 58 is downwardly deformed. The bump 581 disengages from the one of the at least one limiting openings 38. The disk drive module 20 moves in the second inclined direction. When the engaging portion 561 moves backward to the wide portion 361, the disk drive module 20 can be detached from the mounting plate 30.

In one embodiment, after the disk drive module 20 is mounted in the chassis 10, a first end of the disk drive module 20 is located higher than top edges of the plurality of expansion cards 62. A second end opposite to the first end is located lower than the top edges of the plurality of expansion cards 62. The first end is located at a first height relative to the base panel 12. A top edge of each of the plurality of expansion cards 62 is located at a second height relative to the base panel 12. The second end is located at a third height relative to the base panel 12. The second height is less than the first height, but greater than the third height. Thus, the plurality of expansion cards 62 will not block the movement of the disk drive module 20.

While the present disclosure has been illustrated by the description of preferred embodiments thereof, and while the preferred embodiments have been described in considerable detail, it is not intended to restrict or in any way limit the scope of the appended claims to such details. Additional advantages and modifications within the spirit and scope of the present disclosure will readily appear to those skilled in the art. Therefore, the present disclosure is not limited to the specific details and illustrative examples shown and described.

What is claimed is:

1. A computing device comprising: a chassis comprising a base panel and a pair of side panels connected substantially perpendicular to opposite sides of the base panel; a motherboard mounted on the base panel; at least one expansion card attached to the motherboard substantially perpendicular to the base panel and the pair of side panels; and a disk drive module mounted in the chassis and oriented obliquely relative to the base panel, the disk drive module comprising a first end and a second end opposite to the first end, wherein the first end is located at a first height relative to the base panel, a top edge of the at least one expansion card is located at a second height relative to the base panel, and the second end is located at a third height relative to the base panel; the second height is less than the first height, but greater than the third height; the computing device further comprising a mounting plate attached to the chassis and located between the pair of side panels, wherein the mounting plate is oriented obliquely relative to the base panel, and the disk drive module is attached to the mounting plate; the computing device further comprising a bracket attached to a first side panel of the pair of side panels, and the mounting plate comprises a first side flange secured to the bracket and a second side flange secured to a second side panel of the pair of side panels; wherein a plurality of mounting holes is defined in each of the first side flange and the second side flange, a plurality of securing holes is defined in each of the bracket and the second one of the pair of side panels, and the plurality of securing holes is arranged along a line that is inclined relative to the base panel; wherein in assembly, the plurality of mounting holes is aligned with the plurality of securing holes for receiving fasteners; the mounting plate is secured in the chassis by fasteners and is oriented obliquely relative to the base panel.

2. The computing device of claim 1, wherein at least one securing opening is defined in the mounting plate, and at least one securing protrusion protrudes from the disk drive module and engages with the at least one securing opening.

3. The computing device of claim 2, wherein the at least one securing protrusion comprises an engaging portion and a blocking portion that is narrower than the engaging portion, and the at least one securing opening comprises a wide portion corresponding to the engaging portion and a narrow portion corresponding to the blocking portion.

4. The computing device of claim 3, wherein the engaging portion is substantially L-shaped, and the blocking portion comprises a connecting piece extending from the engaging portion along an upward oblique direction and a blocking piece extending from the connecting piece along a downward oblique direction.

5. The computing device of claim 4, wherein the at least one securing protrusion is movable in the at least one securing opening between a first position, where the engaging portion engages with the narrow portion and the blocking piece abuts an edge of the narrow portion to lock the disk drive module, and a second position, where the at least one securing protrusion is engaged with the wide portion to release the disk drive module.

6. The computing device of claim 1, wherein the disk drive module comprises a disk tray and a disk mounted in the disk tray, the disk tray comprises a pair of side plates abutting opposite sides of the disk, and a top flange extends substantially perpendicularly from each of the pair of side plates and abuts a top surface of the disk.

7. The computing device of claim 6, wherein the at least one securing protrusion extends from the top flange, the top flange comprises a resilient piece and a bump protruding from the resilient piece, and a limiting opening is defined in the mounting plate for engaging with the bump.

8. The computing device of claim 1, further comprising a handle attached to the first end.

9. A computing device comprising: a chassis comprising a base panel and a pair of side panels connected to opposite sides of the base panel; a motherboard mounted on the base panel; at least one expansion card attached substantially perpendicular to the motherboard; a mounting plate secured to the pair of side panels and inclined at an acute angle relative to the base panel; and a disk drive module attached to the mounting plate, the disk drive module comprising a first end and a second end opposite to the first end, wherein the first end is located at a first height relative to the base panel, a top edge of the at least one expansion card is located at a second height relative to the base panel, and the second end is located at a third height relative to the base panel; the second height is less than the first height, but greater than the third height; the computing device further comprising a bracket attached to a first side panel of the pair of side panels, and the mounting plate comprises a first side flange secured to the bracket and a second side flange secured to a second side panel of the pair of side panels; wherein a plurality of mounting holes is defined in each of the first side flange and the second side flange, a plurality of securing holes is defined in each of the bracket and the second one of the pair of side panels, and the plurality of securing holes is arranged along a line that is inclined relative to the base panel; wherein in assembly, the plurality of mounting holes is aligned with the plurality of securing holes for receiving fasteners; the mounting plate is secured in the chassis by fasteners and is oriented obliquely relative to the base panel.

10. The computing device of claim 9, wherein at least one securing opening is defined in the mounting plate, and at least one securing protrusion protrudes from the disk drive module and engages with the at least one securing opening.

11. The computing device of claim 10, wherein the at least one securing protrusion comprises an engaging portion and a blocking portion that is narrower than the engaging portion, and the at least one securing opening comprises a wide portion corresponding to the engaging portion and a narrow portion corresponding to the blocking portion.

12. The computing device of claim 11, wherein the engaging portion is substantially L-shaped, and the blocking portion comprises a connecting piece extending from the engaging portion along an upward oblique direction and a blocking piece extending from the connecting piece along a downward oblique direction.

13. The computing device of claim 12, wherein the at least one securing protrusion is movable in the at least one securing opening between a first position, where the engaging portion engages with the narrow portion and the blocking piece abuts an edge of the narrow portion to lock the disk drive module, and a second position, where the at least one securing protrusion is engaged with the wide portion to release the disk drive module.

14. The computing device of claim 13, wherein a limiting opening is defined in the mounting plate, the disk drive module comprises a resilient piece and a bump protruding from the resilient piece, and the bump engages with the limiting opening for preventing the at least one securing protrusion moving from the first position to the second position.

15. The computing device of claim 14, wherein the disk drive module comprises a disk tray and a disk mounted in the disk tray, the disk tray comprises a pair of side plates abutting opposite sides of the disk, and a top flange extends substantially perpendicular from each of the pair of side plates and abuts a top surface of the disk.

16. The computing device of claim 15, wherein the at least one securing protrusion protrudes from the top flange, and the resilient piece extends from the top flange along a direction substantially parallel to the base panel.

17. The computing device of claim 9, further comprising a handle attached to the first end.

* * * * *